(12) United States Patent
Koyama

(10) Patent No.: US 9,618,831 B2
(45) Date of Patent: *Apr. 11, 2017

(54) IMAGE PROJECTOR

(71) Applicant: CANON KABUSHIKI KAISHA, Tokyo (JP)

(72) Inventor: Takehiro Koyama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 65 days.

This patent is subject to a terminal disclaimer.

(21) Appl. No.: 14/753,724

(22) Filed: Jun. 29, 2015

(65) Prior Publication Data
US 2015/0301435 A1    Oct. 22, 2015

Related U.S. Application Data

(63) Continuation of application No. 13/289,028, filed on Nov. 4, 2011, now Pat. No. 9,091,910.

(30) Foreign Application Priority Data

Nov. 15, 2010 (JP) .................. 2010-254908

(51) Int. Cl.
*G03B 21/20* (2006.01)
*G03B 21/14* (2006.01)
*H04N 9/31* (2006.01)

(52) U.S. Cl.
CPC ......... *G03B 21/145* (2013.01); *G03B 21/142* (2013.01); *G03B 21/2066* (2013.01); *H04N 9/3102* (2013.01); *H04N 9/3141* (2013.01)

(58) Field of Classification Search
CPC ...... G03B 21/14; G03B 21/28; G03B 21/145; G03B 21/142; G03B 21/2066
(Continued)

(56) References Cited

U.S. PATENT DOCUMENTS 5,676,442 A    10/1997   Fujimori
5,895,110 A    4/1999    Okada et al.
(Continued)

FOREIGN PATENT DOCUMENTS

JP    11014943 A       1/1999
JP    2002162688 A     6/2002
(Continued)

OTHER PUBLICATIONS

Office Action issued in JP2010-254908, mailed Apr. 30, 2013.
(Continued)

*Primary Examiner* — William C Dowling
(74) *Attorney, Agent, or Firm* — Rossi, Kimms & McDowell LLP

(57) ABSTRACT

An image projector includes a first deflector configured to deflect a first optical path and to form a second optical path, a second deflector configured to deflect the second optical path and to form a third optical path, a shifter configured to shift a projection lens in a vertical direction which corresponds to a longitudinal direction of the projected surface among directions orthogonal to an optical axis of the projection lens, a housing configured to house the first deflector and the second deflector, and a fixed plate fixed onto the housing at an end on an installing surface side of the housing, the projection lens and the shifter being fixed onto the fixed plate, wherein the third optical path is closer to an installing surface of the housing than the first optical path.

6 Claims, 2 Drawing Sheets

(58) Field of Classification Search
USPC .................................. 353/79, 100, 101, 119
See application file for complete search history.

(56) References Cited

U.S. PATENT DOCUMENTS

| | | |
|---|---|---|
| 6,419,362 B1 | 7/2002 | Ikeda et al. |
| 6,966,657 B2 | 11/2005 | Van De Velde et al. |
| 7,014,324 B2 | 3/2006 | Jang |
| 7,670,012 B2 | 3/2010 | Solomon et al. |
| 2007/0273847 A1 | 11/2007 | Minami et al. |

FOREIGN PATENT DOCUMENTS

| | | |
|---|---|---|
| JP | 3339504 B | 10/2002 |
| JP | 2005157370 A | 6/2005 |
| JP | 2009157149 A | 7/2009 |
| JP | 2010160409 A | 7/2010 |

OTHER PUBLICATIONS

Office Action issued in U.S. Appl. No. 13/289,028, mailed Aug. 19, 2013.
Office Action issued in U.S. Appl. No. 13/289,028, mailed Mar. 10, 2014.
Office Action issued in U.S. Appl. No. 13/289,028, mailed Oct. 3, 2014.
Notice of Allowance issued in U.S. Appl. No. 13/289,028, mailed Mar. 23, 2015.

IMAGE PROJECTOR

BACKGROUND OF THE INVENTION

Field of the Invention

The present invention relates to an image projector.

Description of the Related Art

Japanese Patent No. 3,339,504 discloses an image projector configured to deflect an optical path of light emitted from a light source, to arrange an optical path of a projection lens above the optical path of the light emitted from the light source, and to make vertically shiftable the projection lens of the projection lens by the shifter.

It is difficult to miniaturize such a conventional image projector that deflects the optical path and includes the shifter for the projection lens because the vertical length (or height) of the housing is likely to increase. In addition, when the projection lens and the shifter are fixed onto a fixed plate and when a lower end of the fixed plate is fixed onto a bottom plate of a housing of the image projector, the vertical length or height of the fixed plate becomes large and the fixed plate is likely to incline in the horizontal direction. As a result, projected image quality may deteriorate as an image plane of the projection lens fluctuates.

SUMMARY OF THE INVENTION

The present invention provides a smaller image projector having a good characteristic.

An image projector according to the present invention includes an image display element configured to display an original image, a first deflector configured to deflect a first optical path through which light from a light source can pass, and to form a second optical path, a second deflector configured to deflect the second optical path and to form a third optical path, a projection lens configured to project light that has transmitted the image display element and the third optical path, onto a projected surface, a shifter configured to shift the projection lens in a vertical direction which corresponds to a longitudinal direction of the projected surface among directions orthogonal to an optical axis of the projection lens, a housing configured to house the image display element, the first deflector, and the second deflector, and a fixed plate fixed onto the housing at an end on an installing surface side of the housing, the projection lens and the shifter being fixed onto the fixed plate, wherein the third optical path is closer to an installing surface of the housing than the first optical path.

Further features of the present invention will become apparent from the following description of exemplary embodiments with reference to the attached drawings.

DESCRIPTION OF THE EMBODIMENTS

Figure 1:
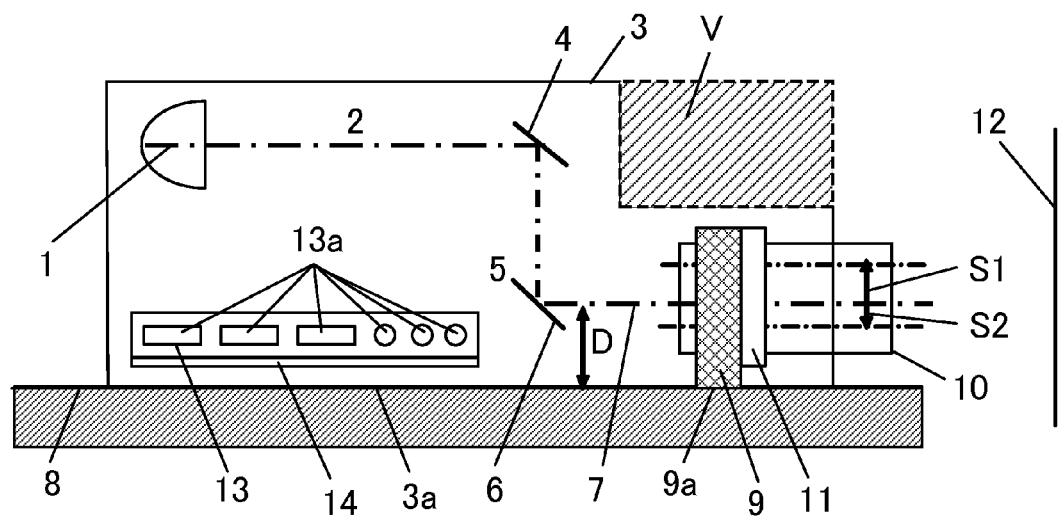
FIG. 1 is an optical path diagram of an image projector of this embodiment installed on a projection stage.

FIG. 1 is an optical path of an image projector (projection type display apparatus) of this embodiment installed on a projection stage 8. In FIG. 1, reference numeral 1 denotes a light source lamp. Reference numeral 2 denotes a first optical path that extends in a horizontal direction in which light emitted from the light source lamp 1 passes. Reference numeral 3 denotes a housing of the image projector.

Reference numeral 4 is a first deflector configured to deflect the first optical path 2 by 90° and to form a vertically extending second optical path 5. Reference numeral 6 is a second deflector configured to deflect the second optical path 5 by 90° and to form a horizontally extending third optical path 7. A deflecting angle made by each of the first deflector 4 and the second deflector 6 is not limited to 90°.

In this embodiment, the first optical path 2 is parallel to the third optical path 7, and each of the first optical path 2 and the third optical path 7 is perpendicular to the second optical path 5. The second optical path extends in the vertical direction.

As a light deflecting method, each of the first deflector 4 and the second deflector 6 can use reflection using a mirror or a polarization splitting film. The second deflector 6 is closer to the installing surface of the housing 3 than the first deflector 4.

In FIG. 1, an installing surface 3a of the housing 3 is a (bottom) surface of the bottom plate of the housing 3 on the side of the projection stage 8. In FIG. 1, the installing surface side of the housing 3 is the lower side and the side opposite to the installing surface side of the housing 3 is the upper side, whereas in FIG. 2, which will be descried later, the housing 3 is fixed onto a ceiling upside down and the vertical relationship is inverted.

The light flux from the light source lamp 1 passes the first optical path 2, is downwardly reflected by the first deflector 4, passes the second optical path 5, is reflected by the second deflector 6, passes the third optical path 7, and enters the projection lens (projection optical system) 10.

The image projector further includes an image display element (not illustrated) configured to display an original image, and the projection lens 10 projects image light that has passed the image display element and the third optical path 7 onto a projected surface (screen) 12.

The projection lens 10 is configured shiftable by the shifter 11. The shifter 11 shifts the projection lens 10 in the vertical direction (in FIG. 1) which corresponds to the longitudinal direction of the projected surface 12 among directions orthogonal to the optical axis of the projection lens 10. The shifter 11 and the projection lens 10 are fixed onto the fixed plate 9. An end 9a of the fixed plate 9 on the lower side is fixed onto the exterior of the lower part of the housing 3 (which is the installing surface 3a of a member fixed onto the installing surface 3a).

THe image display element (not illustrated), the first deflector 4, and the second deflector 6 are housed in the housing 3, but the projection lens 10 partially projects from the housing 3. In addition, the fixed plate 9 and the shifter 11 may not be housed in the housing 3.

Conventionally, the first optical path 2 is closer to the installing surface of the housing 3 than the third optical path 7 due to the heavy light source lamp 1 is heavy or due to another reason. However, this embodiment arranges the third optical path 7 closer to the installing surface of the housing 3 than the first optical path 2.

As a result, the projection lens 10 is arranged at the lower part of the housing 3, and a distance D between the lower end 9a of the fixed plate 9 and the optical axis of the projection lens 10 becomes smaller than the conventional one and thereby the image projector can be made smaller in the vertical direction (height direction). For example, as illustrated in FIG. 1, a hatched space V at the upper portion of the projection lens 10 may be removed from the housing 3 and the housing 3 may be made smaller, or a functional component may be provided to the space V for the effective utilization of the space V.

In addition, the cost can be reduced due to the reduced vertical length (height) of the fixed plate 9.

Moreover, due to the shorter length (height) of the fixed plate 9 in the vertical direction, the fixed plate 9 becomes less likely to incline in the horizontal direction (lateral direction in FIG. 1). Therefore, the fixed plate 9 becomes less likely to incline irrespective of the weight of the projection lens 10 and the image display element's display surface (not illustrated) and the image plane of the projection lens 10 are less likely to fluctuate, the image display element and the illumination optical system (not illustrated) used to illuminate the image display element are less likely to incline. Since the image quality on the projected surface 12 can be maintained, the optical characteristic of the image projector can be maintained.

In the longitudinal direction as the shifting direction of the shifter 11, assume a shift amount S2 by which the projection lens 10 can be shifted in the downward direction corresponding to the installing surface side of the housing 3 and a shift amount S1 by which the projection lens 10 can be shifted in the upward direction corresponding to the side opposite to the installing surface side of the housing 3. In this case, the shift amount S1 in the upward direction may be the same as the shift amount S2 in the downward direction (i.e., S1=S2) but the shift amount S1 may be larger than the shift amount S2. In the latter case, the height of the housing 3 can become smaller and the fixed plate 9 may be made shorter as the shift amount S2 decreases. Thereby, the cost reduction and the maintenance of the optical characteristic are obtained.

In addition, an interface substrate 13 and a main substrate 14 are further provided by mounting an input/output terminal 13a between the first optical path 2 and the installing surface 3a of the housing 3. This configuration can reduce the dead space in the housing, effectively utilize the internal space of the housing 3, and miniaturize the housing 3. The input/output terminal 13a is connectable to an interface connector, and can transmit and can receive a variety of signals including image information to be projected onto the projected surface 12.

Figure 2:
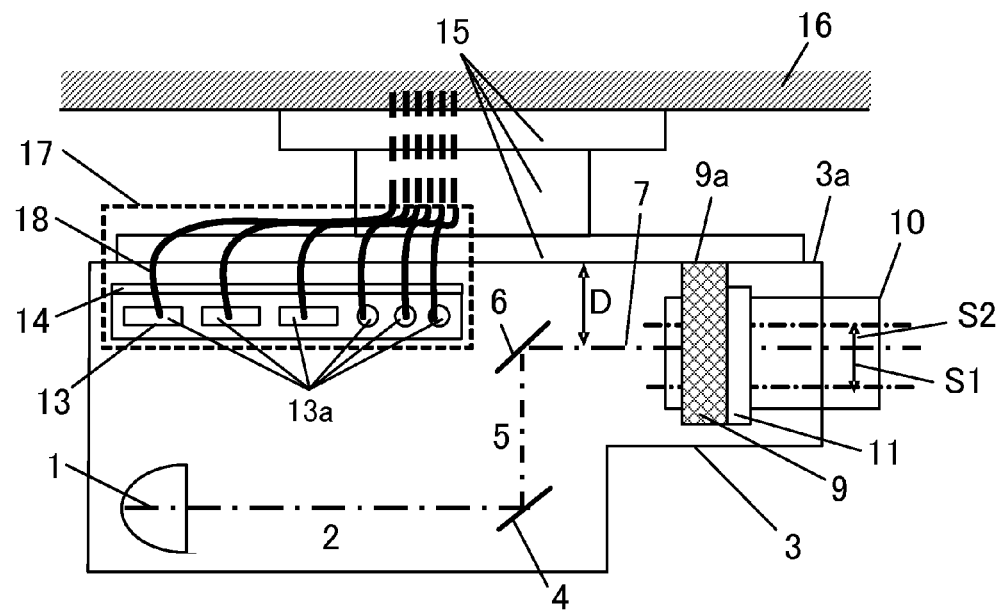
FIG. 2 is an optical path diagram when the image projector illustrated in FIG. 1 is hung down from a ceiling.

FIG. 2 is an optical path diagram of the image projector hung from a ceiling 16. When the image projector is hung down from the ceiling 16, the housing 3 is arranged upside down, a lifting hook 15 illustrated in FIG. 2 is attached onto the bottom surface (or installing surface) of the housing 3, and the lifting hook 15 is fixed onto the ceiling 16.

In this case, in addition to the above effect, the fixed plate 9 can be arranged near the lifting hook 15 that supports the housing 3 and high rigidity, and this configuration can restrain the image degradation by preventing the fall of the projection lens 10, and improves the optical characteristic of the image projector.

Moreover, since the interface substrate 13 is arranged near the lifting hook 15, cables 18 connected to the input/output terminal 13a can be trained along the lifting hook 15 by the shortest distance. Since the cable 18 becomes shorter, the influences of noises can be reduced and the electric characteristic of the image projector and the image quality of the projected image can be maintained. In addition, a cover member 17 configured to cover the cable 18 can be made smaller and the projection by the cover member 17 can become easier.

The end 9a of the fixed plate 9 is screwed onto the exterior 3a of the housing 3 in FIGS. 1 and 2, but they may be fixed onto the housing 3 on the side opposite to the installing surface side of the housing 3 so as to enhance the fall preventive effect of the fixed plate 9. As a fixing method, one of the fixed plate 9 and the housing 3 is provided with a boss and the other is provided with a concave engageable with the boss, or a fixation using a screw may be used.

The fixed plate 9 may be connected one or more optical element, such as a prism, as described later.

A description will now be given of an example of an optical system arranged in the first optical path 2, the second optical path 5, and the third optical path 7.

First Embodiment

Figure 3:
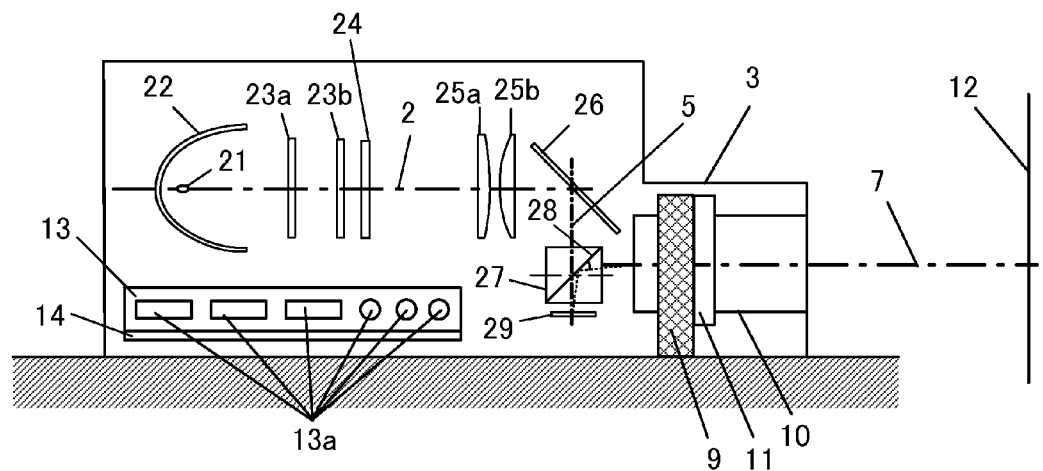
FIG. 3 is an optical path diagram of an image projector of a first embodiment corresponding to FIG. 1.

FIG. 3 is a concrete optical path diagram of an image projector according to a first embodiment corresponding to FIG. 1. In FIG. 3, reference numeral 21 denotes a light source. Reference numeral 22 denotes a (parabolic) reflector configured to reflect light from the light source 21 to the right side in FIG. 3 and to convert the light into approximately collimated light. The light source 21 and the reflector 22 correspond to the light source lamp 1 in FIG. 1. The light source 21 emits, for example, white light.

An illumination optical system is arranged in the first optical path 2 and configured to uniformly Kohler-illuminate the reflective liquid-crystal panel 29. The illumination optical system includes a first fly-eye lens 23a, a second fly-eye lens 23b, a polarization conversion element 24, and condenser lenses 25a, 25b.

The first fly-eye lens 23a includes panels and rectangular lenses having similar shapes in a matrix. The second fly-eye lens 23b includes lenses corresponding to respective lenses of the first fly-eye lens 23a. The first and second fly-eye lenses 23a, 23b form a secondary light source configured to split light fluxes and to uniformly illuminate the reflective liquid-crystal panel 29. The polarization conversion element 24 converts non-polarized light from the light source 21 into linearly polarized light, such as P-polarized light, having a specific polarization direction.

Reference numeral 26 denotes a mirror corresponding to the first deflector 4, reference numeral 27 denotes a polarization beam splitter (prism), and reference numeral 28 denotes a polarization splitting film of the polarization beam splitter 27. Reference numeral 29 denotes an image display element configured to form an original image that includes a reflective liquid-crystal panel configured to modulate or change the polarization state of the incident light to reflect the light, and to form an image. In this embodiment, the polarization beam splitter 27 may be further fixed onto the fixed plate 9.

In the first optical path 2, the light from the light source 21 is reflected by the reflector 22 and turned into approximately collimated light, passes the first and second fly-eye lenses 23a, 23b, is converted into P-polarized light by the polarization conversion element 24, is condensed by the condenser lenses 25a, 25b, and reaches the mirror 26.

The condensed light reflected by the mirror 26 passes the second optical path 5, and enters the polarization beam splitter 27. The polarization splitting film 28 transmits the condensed light, such as the P-polarized light, and reflects the modulated light, such as the S-polarized light, reflected by the reflective liquid-crystal panel 29 toward the projection lens 10. The projection lens 10 projects on the projected surface 12 light that has passed the third optical path 7 as an image. The projection lens 10 is configured vertically movable by the shifter 11.

Second Embodiment

Figure 4:
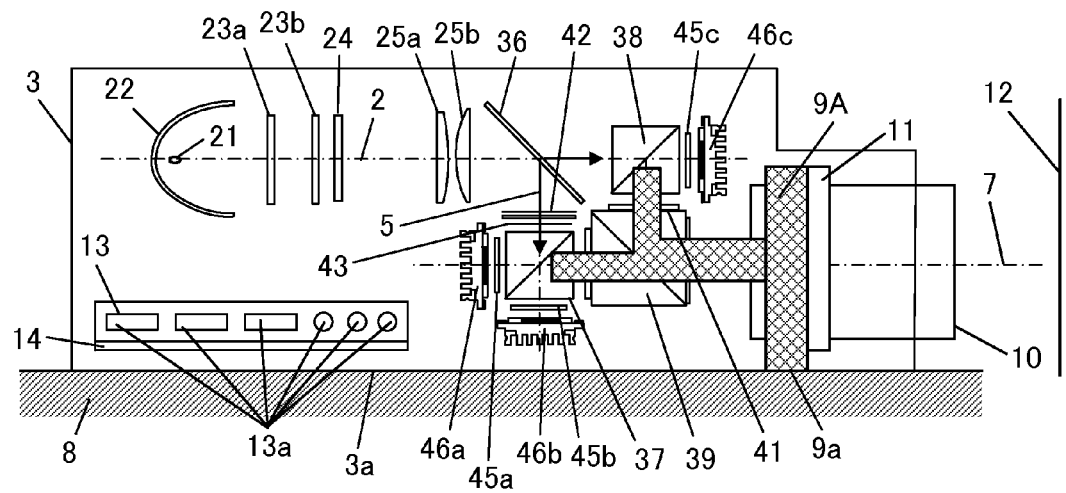
FIG. 4 is an optical path diagram of an image projector of a second embodiment corresponding to FIG. 1.

FIG. 4 is an optical path diagram of an image projector according to a second embodiment corresponding to FIG. 1. In FIG. 4, reference numerals 21 to 25b denote the same elements illustrated in FIG. 3. Reference numeral 36 denotes a dichroic mirror, Reference 37 denotes a polarization beams splitter (prism) for blue and red. Reference numeral 38 denotes a polarization beam splitter (prism) for green. Reference numeral 39 denotes a color synthesizing prism (synthesizing optical system) configured to reflect a light flux in the green wavelength band and to transmit light fluxes of red and blue wavelength bands.

Reference numerals 41 and 42 denote polarizing plates. Reference numeral 43 denotes a wavelength-selective phase plate configured to rotate a polarization direction of red light by 90°. Reference numeral 45a denotes a quarter plate for red, and reference numeral 46a denotes a reflective liquid-crystal panel for red. Reference numeral 45b denotes a quarter plate for blue, and reference numeral 46b denotes a reflective liquid-crystal panel for blue. Reference numeral 45c denotes a quarter plate for green, and reference numeral 46c denotes a reflective liquid-crystal panel for green. Each color is converted into P-polarized light or S-polarized light by the wavelength-selective phase plate 43 and the quarter plates 45a, 45b, 45c.

The dichroic mirror 36 separates white light from the illumination optical system (23a to 25b) by transmitting first color light, such as green light, and by reflecting second color light and third color light, such as red light and blue light. The optical path for the second color light and the third color light can be regarded as the second optical path 5.

The polarization beam splitter 38 transmits the first color light, such as P-polarized light, which has transmitted the dichroic mirror 36 and allows that light to reach the reflective liquid-crystal panel 46c. The first color light, such as S-polarized light, reflected by the reflective liquid-crystal panel 46c is reflected by the polarization beam splitter 38, and reaches the color synthesizing prism 39, and this optical path for the reflected light can be regarded as the second optical path 5.

The polarization beam splitter 37 reflects the second color light, such as S-polarized light, reflected by the dichroic mirror 36, and allows that light to reach the reflective liquid-crystal panel 46a. The second color light, such as P-polarized light, reflected by the reflective liquid-crystal panel 46a passes the polarization beam splitter 37, and reaches the color synthesizing prism 39. The polarization beam splitter 37 transmits the third color light, such as P-polarized light, reflected by the dichroic mirror 36, and allows that light to reach the reflective liquid-crystal panel 46b. The third color light, such as S-polarized light, reflected by the reflective liquid-crystal panel 46b is reflected by the polarization beam splitter 37, and reaches the color synthesizing prism 39.

The color synthesizing prism 39 synthesizing first color light to third color light, and introduces the resultant light to projection lens 10. The optical path of the light emitted from the color synthesizing prism 39 is the third optical path 7. The projection lens 10 projects the first color light to the third colored light that are synthesized with one another, onto the projected surface 12. The projection lens 10 is configured movable in the vertical direction by the shifter 11.

This embodiment uses a fixed plate 9A instead of the fixed plate 9. Of course, the fixed plate 9 may be used instead of the fixed plate 9A. The projection lens 10 and the shifter 11 are fixed onto the fixed plate 9, whereas the polarization beam splitters (prisms) 37, 38 and the color synthesizing prism 39 in addition to them are further fixed onto the fixed plate 9A.

When a positional relationship shifts among the plurality of prisms, the resolution and the image quality lower due to the display pixel shifts of the reflective liquid-crystal panels 46a to 46c and the fall of the optical components. The fixed plate 9A maintains the positional relationship among the plurality of prisms, prevents the optical axis's shifts, and realizes high image quality. Moreover, since the fixed plate 9A is located near the installing surface 3a of the housing 3, the optical performance is not deteriorated due to the fixed plate 9A.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-254908, filed Nov. 15, 2010 which is hereby incorporated by reference herein in its entirety.

What is claimed is:

1. An image projector comprising:
   an image display element configured to display an original image;
   a first deflector configured to deflect a first optical path through which light from a light source passes, and to form a second optical path;
   a second deflector configured to deflect the second optical path and to form a third optical path;
   a shifter configured to shift a projection lens in a direction from the third optical path toward the first optical path and in a direction from the first optical path toward the third optical path, which is orthogonal to an optical axis of the projection lens, the projection lens projecting light that has passed the image display element, the first deflector, and the second deflector; and
   a holder configured to integrally hold the projection lens, the shifter, and the second deflector,
   wherein the shifter is configured so that, in relation to the third optical path, a shiftable amount of the projection lens in a direction toward the first optical path is larger than a shiftable amount in a direction opposite to the direction toward the first optical path.

2. The image projector according to claim 1, further comprising a lifting hook attachable to the housing on the side of the installing surface.

3. The image projector according to claim 1, further comprising an interface substrate mounted with an input/output terminal and arranged between the first optical path and the installing surface of the housing.

4. The image projector according to claim 1, further comprising:
   a housing configured to house the image display element, the first deflector, and the second deflector, and having an installing surface, which is one of a top surface or a bottom surface,
   wherein the third optical path is closer to the installing surface than the first optical path, and
   wherein the holder is fixed to the housing at an installing surface side of the housing.

5. The image projector according to claim 1, further comprising:
   a housing configured to house the image display element, the first deflector, and the second deflector, wherein the housing has an installing surface, which is one of a top surface or a bottom surface, and wherein the holder holds the second deflector from a surface orthogonal to the installing surface of the housing.

6. The image projector according to claim 1, further comprising a cover member configured to cover the input/output terminal.

* * * * *